United States Patent
Lam

(10) Patent No.: US 6,625,708 B1
(45) Date of Patent: Sep. 23, 2003

(54) METHOD AND APPARATUS FOR DYNAMICALLY DEFINING LINE BUFFER CONFIGURATIONS

(75) Inventor: Fong-Shek Lam, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/447,536

(22) Filed: Nov. 23, 1999

(51) Int. Cl.$^7$ .............................................. G06F 12/00
(52) U.S. Cl. ....................... 711/170; 711/129; 711/209; 710/52; 710/56; 710/104
(58) Field of Search .......................... 710/52, 56, 104, 710/310; 711/129, 153, 154, 156, 170, 171, 172, 173, 209

(56) References Cited

U.S. PATENT DOCUMENTS

| | | | | | |
|---|---|---|---|---|---|
| 4,499,539 A | * | 2/1985 | Vosacek | ...................... | 707/205 |
| 5,916,309 A | * | 6/1999 | Brown et al. | ................ | 348/116 |
| 5,951,658 A | * | 9/1999 | Daray et al. | ................... | 710/52 |
| 5,963,977 A | * | 10/1999 | Gold et al. | .................. | 711/154 |
| 6,041,397 A | * | 3/2000 | Rickard et al. | ............. | 711/170 |
| 6,065,103 A | * | 5/2000 | Tran et al. | ................... | 711/117 |
| 6,098,125 A | * | 8/2000 | Fiacco et al. | ............... | 370/235 |
| 6,385,672 B1 | * | 5/2002 | Wang et al. | ................ | 710/305 |
| 6,385,673 B1 | * | 5/2002 | DeMoney | ................... | 709/225 |

* cited by examiner

Primary Examiner—Donald Sparks
Assistant Examiner—Christian P. Chace
(74) Attorney, Agent, or Firm—Blakely, Sokoloff, Taylor & Zafman LLP

(57) ABSTRACT

A method and apparatus of defining a line buffer configuration in a memory is disclosed. In one embodiment, the method and apparatus receives input data information and mode information, proceeds to select a type of the line buffer configuration according to the mode information, and dynamically generates addresses for the selected type of line buffer configuration in the memory according to the input data information.

22 Claims, 8 Drawing Sheets

METHOD AND APPARATUS FOR DYNAMICALLY DEFINING LINE BUFFER CONFIGURATIONS

FIELD OF THE INVENTION

This invention relates to memory technologies generally and particularly to defining line buffer configurations in a memory system.

BACKGROUND OF THE INVENTION

Since programs tend to reuse data and instructions they have used recently, processors executing such programs often utilize cache memory to further enhance their overall performances. A system designer typically uses the fastest memory available in the system's memory hierarchy, such as Static Random Access Memory (SRAM), for cache memory. Since SRAMs use more circuits per bit than a slower type of memory, such as Dynamic Random Access Memory (DRAM), to prevent the information from being disturbed when read, SRAMs tend to have the same access time and cycle time. "Line buffers" refer to portions of the described cache memory and usually store intermediate results within a data processing system. For example, an image processing system may employ line buffers for storing some interpolation results of the system's image processing routines. Traditionally, line buffer configurations are straightforward. Frequently a system architect of data processing systems would predefine the size and the number of line buffers according to particular designs of the systems.

However, when the data processing systems require utilization of various types of line buffers at different occasions, the previously discussed approach of predetermining the size and number of line buffers becomes expensive and impractical. For instance, when an image processing system predefines two line buffers with certain sizes to store X bytes of incoming video data, as long as the incoming data do not exceed X bytes, these line buffers may still permit the system to generate accurate end results. On the other hand, when the incoming video data exceed X bytes, these line buffers alone may become unable to correctly handle these excess data. Furthermore, remedying this described scenario may include additional cache memory or additional circuit logic and thus increases the cost of the image processing system.

Therefore, a method and apparatus is needed to dynamically define line buffer configurations in a memory.

SUMMARY OF THE INVENTION

A method and apparatus of defining a line buffer configuration in a memory is disclosed. In one embodiment, the method and apparatus receives input data information and mode information, proceeds to select a type of the line buffer configuration according to the mode information, and dynamically generates addresses for the selected type of line buffer configuration in the memory according to the input data information.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

A method and apparatus of defining a line buffer configuration in a memory is described. In the following description, numerous specific details are set forth such as, various video data formats, SRAMs, cache memory, planar video format, packed video format, etc. in order to provide a thorough understanding of the disclosed method and apparatus. However, it will be apparent to one of ordinary skill in the art that the disclosure may be practiced without these particular details. In other instances, well-known elements and theories, such as First-IN-First-Out (FIFO). buffers, SRAMs, write addresses, feedback read addresses, display read addresses, various video data formats, source image line, etc., have not been discussed in special details in order to avoid obscuring the disclosure.

Additionally, "line buffers" and "FIFO buffers" are used interchangeably throughout the written description. A "quad word" or QW refers to 64 binary bits. Although some of the description discusses quad words, it should be understood that such a data size is not necessary practice the present invention.

Figure 1:
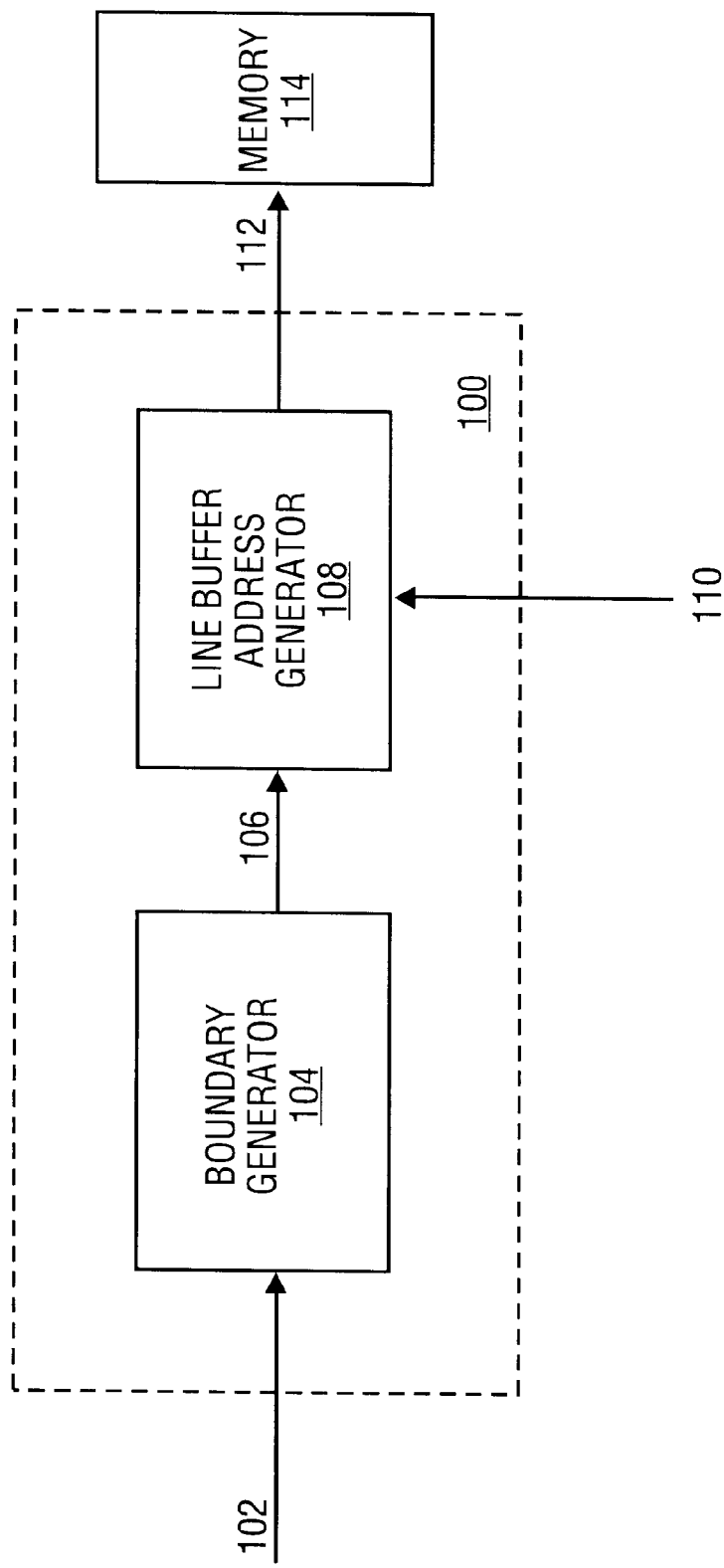
FIG. 1 illustrates a general block diagram of one embodiment of a line buffer configurator.

FIG. 1 demonstrates a general block diagram of one embodiment of line buffer configurator (or hereinafter LBC) 100, which defines a line buffer configuration in a memory. Boundary generator 104 receives input data information 102, which may comprise data size or data type information. Data type information may indicate a particular video data format such as, for example, RGB555, RGB565, YUV422, YUV420, YUV410 or YUV411. Alternatively, boundary generator 104 may be capable of receiving raw data in any of the video data formats mentioned above and extracting relevant information from the raw data.

Based on pertinent information derived from input data information 102, boundary generator 104 generates and transmits boundary information 106 to line buffer address generator 108. According to its received mode information 110, line buffer address generator 108 generates and transmits read and write addresses 112 to memory 114.

In one embodiment, LBC 100 often resides in a microprocessor, which resides in an electronic system. In other embodiments, LBC 100 may instead reside in a system controller of an electronic system. Some examples of the electronic system are, but not limited to, standalone electronic apparatuses and general-purpose computer systems. A general-purpose computer system 200 is illustrated in FIG. 2.

The general-purpose computer system architecture comprises microprocessor 202 and cache memory 206 coupled to each other through processor bus 204. Cache memory 206 typically comprises fast memory such as SRAM. Sample computer system 200 also includes high performance system bus 208 and standard I/O bus 228. Coupled to high performance system bus 208 are microprocessor 202 and system controller 210. Additionally, system controller 210 is coupled to memory subsystem 216 through channel 214, is coupled to I/O controller hub 226 through link 224 and is coupled to graphics controller 220 through interface 222. Coupled to graphics controller is video display 218. Coupled to standard I/O bus 228 are I/O controller hub 226, mass storage 230 and alphanumeric input device or other conventional input device 232. These elements perform their conventional functions well known in the art.

Figure 2:
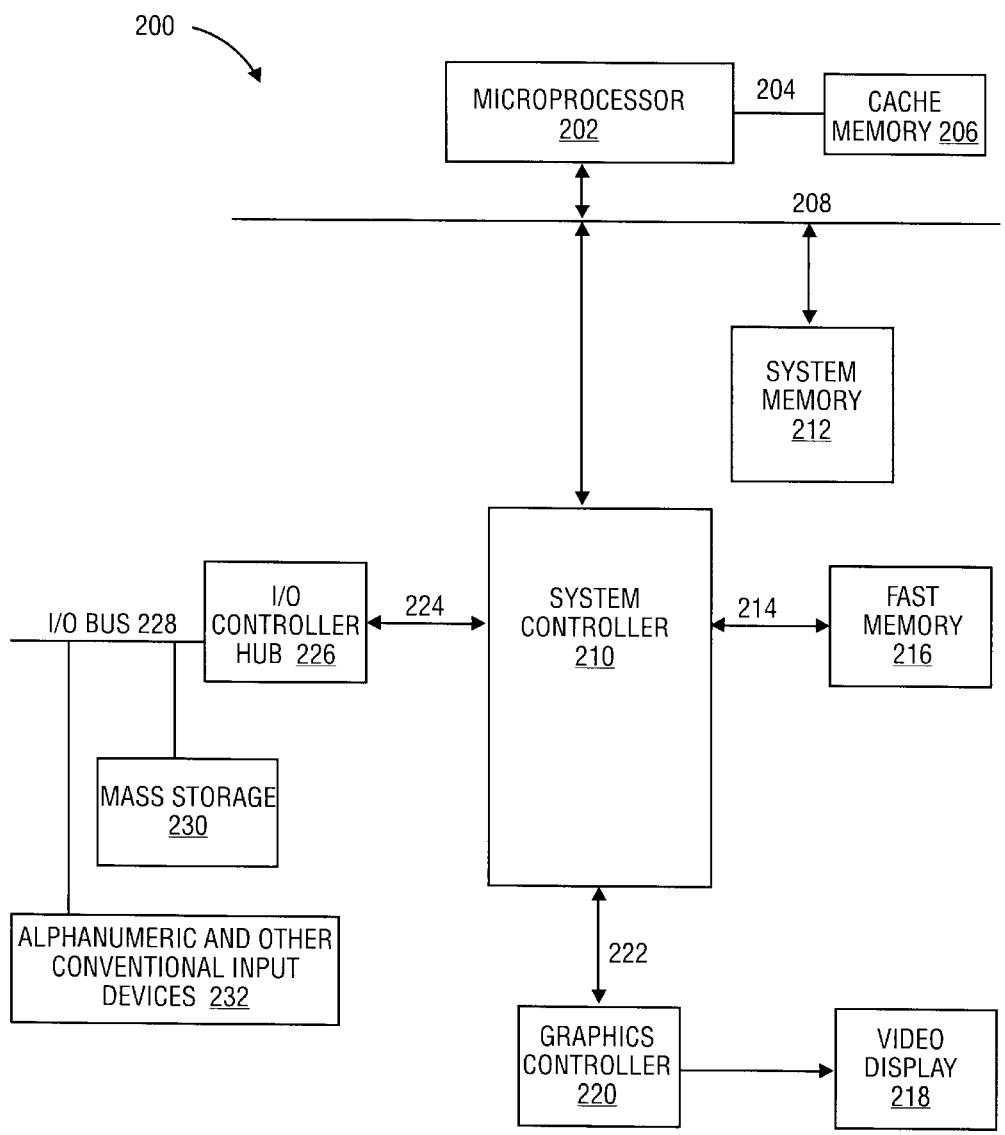
FIG. 2 illustrates a general purpose computer system architecture.

Moreover, system controller 210 shown in FIG. 2 provides various subsystems with direct links to the controller. The direct links, such as 224 and 222, to system controller 210 ensure mass storage 230 and graphics controller 220 deterministic access to and from memory subsystem 216. However, one ordinarily skilled in the may adopt a different system architecture such that the various subsystems can communicate with one another through a local bus, such as Peripheral Component Interconnect (hereinafter PCI), and yet still remain within the scope of the present invention.

Detailed Operation of One Embodiment of the Line Buffer Configurator

The previously discussed line buffer configurator dynamically defines a line buffer configuration in a memory. Specifically, LBC 100 shown in FIG. 1 receives input data information 102 and mode information 110 and generates read and write addresses 112 for memory 114.

Figure 3:
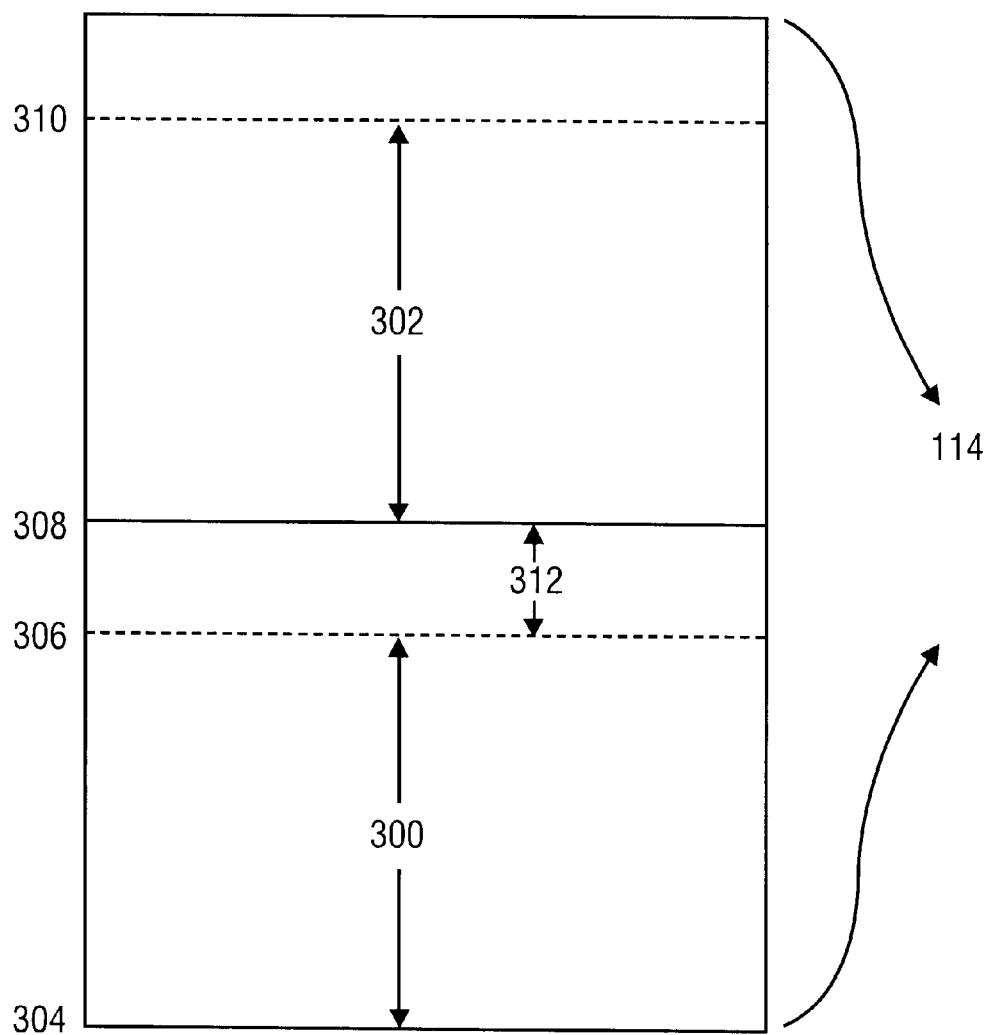
FIG. 3 illustrates one memory layout for configuring line buffers.

For purposes of understanding LBC 100, one particular memory configuration and two types of line buffer configurations are discussed in details in subsequent paragraphs. FIG. 3 illustrates an example of memory 114 configured to contain either of the mentioned two types of configurations: two line buffers or one line buffer. Specifically, memory 114 is divided into two halves, lower half 300 and higher half 302. Lower half 300 represents memory addresses between address 304 and address 306, and higher half 302 represents addresses between 308 and 310. Addresses 304 and 308 are the lowest available addresses for their respective halves, and addresses 306 and 310 are the highest available addresses for theirs.

In order to allow LBC 100 to access memory locations from either halves efficiently, the most significant bit (MSB) for the addresses of higher half 302 is one, while the MSB for lower half 300 is zero. As a result of manipulating MSBs of the halves to be different, the memory addresses between lower half 300 and higher half 302 may no longer remain contiguous. Thus, when the amount of data intending to be stored in lower half 300 exceeds lower half 300's storage capacity, address 306 is incremented by offset 312 in order to access higher half 302 memory locations. It should however be apparent to one ordinarily skilled in the art to implement LBC 100 without the described offset 312 and yet still remain within the scope of the invention.

Figure 4A:
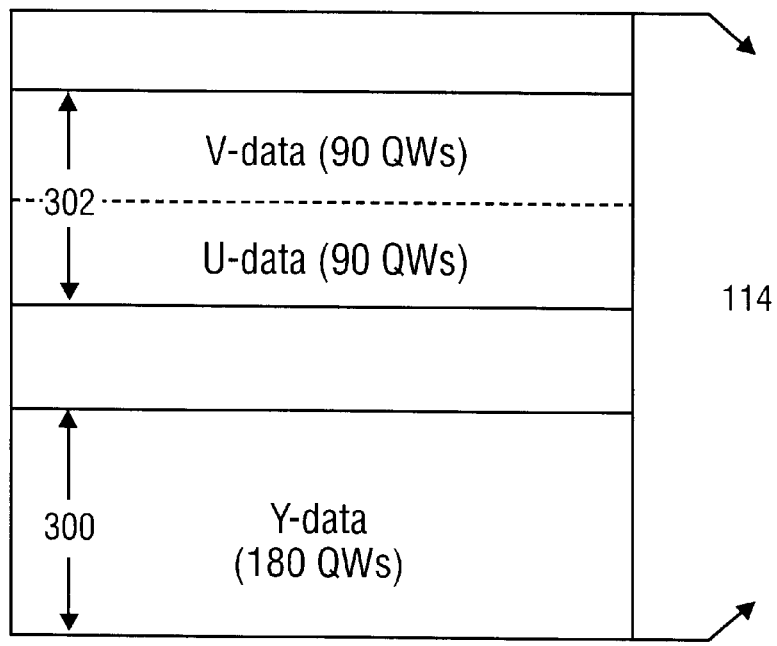
FIG. 4(a) illustrates an example memory layout of a one line buffer configuration for YUV420 planar video data.
Figure 4B:
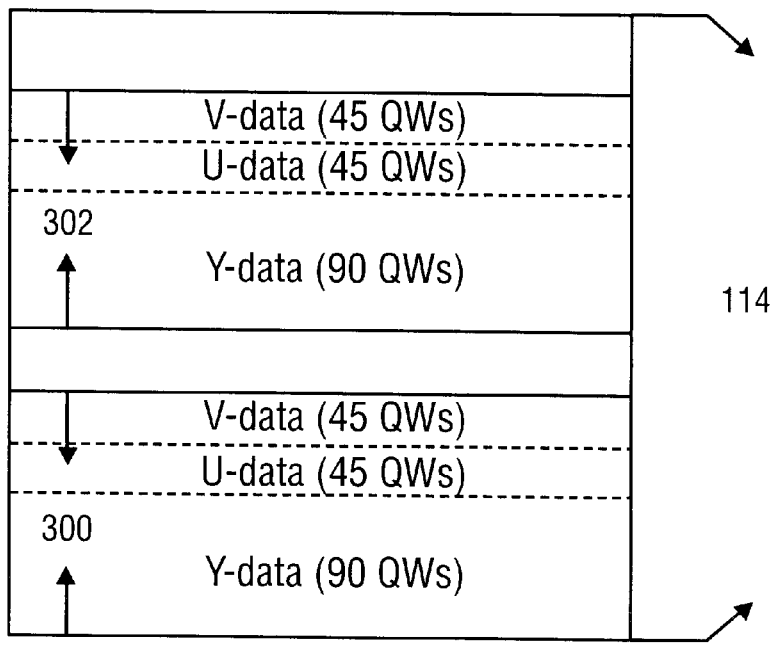
FIG. 4(b) illustrates an example memory layout of a two line buffer configuration for YUV420 planar video data.

For illustrations purposes, the subsequent discussions of line buffer configurations with specific video data formats assume 180 QWs of memory locations for each of lower half 300 and higher half 302. With the memory layout in FIG. 3 and the assumed 180 QWs, FIGS. 4(a) and 4(b) illustrate examples of a one line buffer configuration and a two line buffer configuration containing planar YUV420 video data. In conjunction with FIG. 3, FIG. 4(a) demonstrates using both lower half 300 and higher half 302 to store the video data. All the Y data are grouped together and stored in a FIFO fashion, and so are the U data and the V data.

Figure 4C:
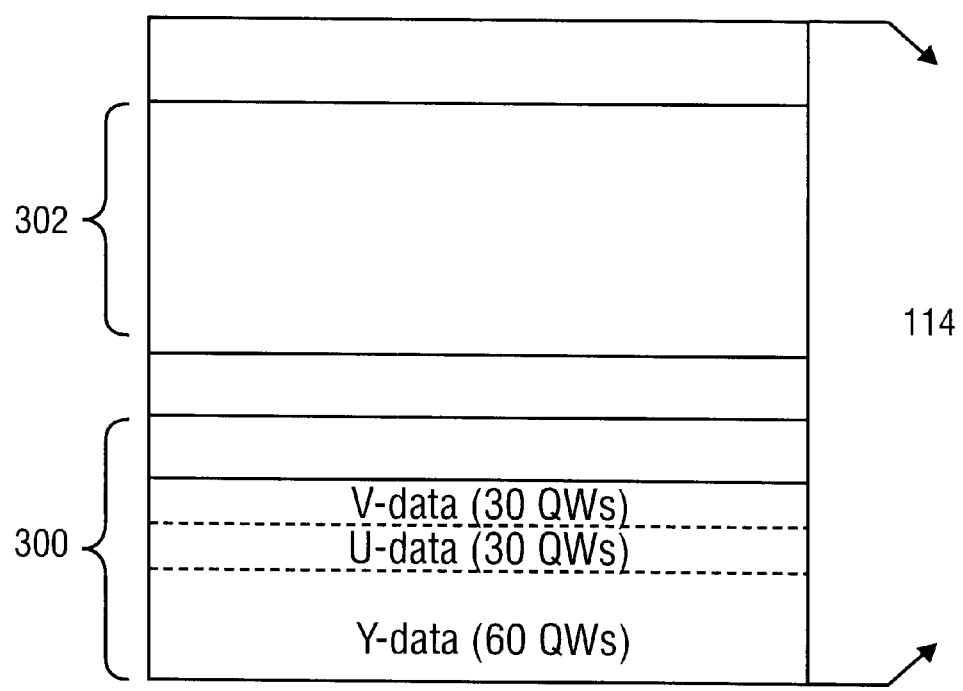
FIG. 4(c) illustrates another example memory layout of a one line buffer configuration for planar video data, where only the lower half of the memory is utilized.

With the assumed memory availability, lower half 300 can store up to 180 QWs of Y data, and higher half 302 can store up to 90 QWs of U data and up to 90 QWs of V data as in the arrangement shown in FIG. 4(a). It should be noted that one line buffer configuration may use lower half 300 only to store video data. FIG. 4(c) illustrates a 120-QW-example where lower half 300 stores all of Y, U and V data.

On the other hand, FIG. 4(b) shows a two line buffer configuration containing the same YUV420 video data. Specifically, the two line buffers are labeled as line buffer 0 and line buffer 1. Lower half 300 is configured to be line buffer 0 and contains the appropriate Y, U and V data in a FIFO fashion. Higher half 302 is line buffer 1 and also contains Y, U and V data.

Figure 5A:
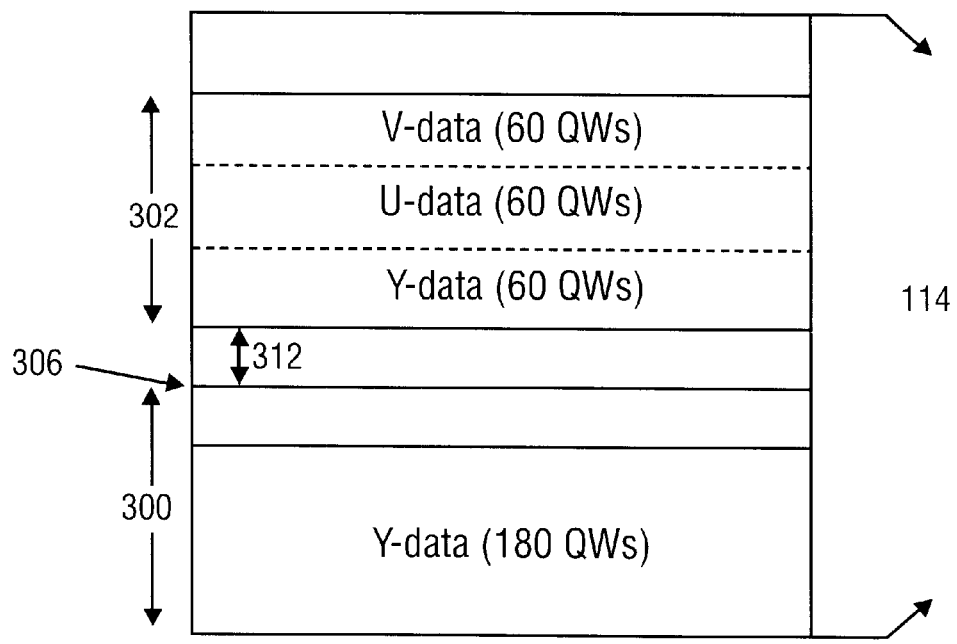
FIG. 5(a) illustrates an example memory layout of a one line buffer configuration for YUV410 data.
Figure 5B:
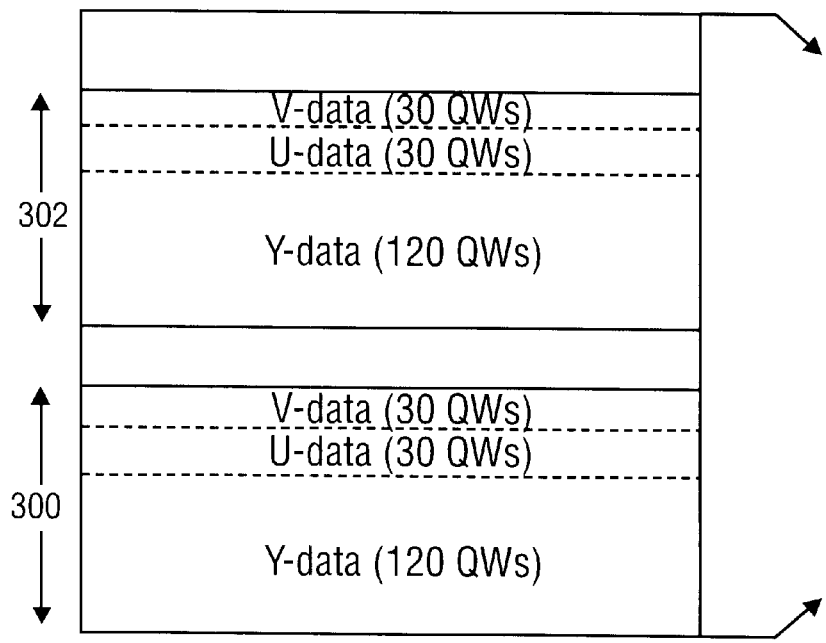
FIG. 5(b) illustrates an example memory layout of a two line buffer configuration for YUV410 data.

Similar to FIGS. 4(a) and 4(b), FIGS. 5(a) and 5(b) demonstrate the two types of line buffer configurations using a different video data format, namely, YUV410. In the one line buffer configuration as shown in FIG. 5(a), Y data of this set of YUV410 video data exceed the number of memory locations lower half 300 is allocated for. Thus, in order to access and store the rest of the Y data in the memory locations of higher half 302, highest available address 306 for lower half 300 is incremented by offset 312.

Figure 6:
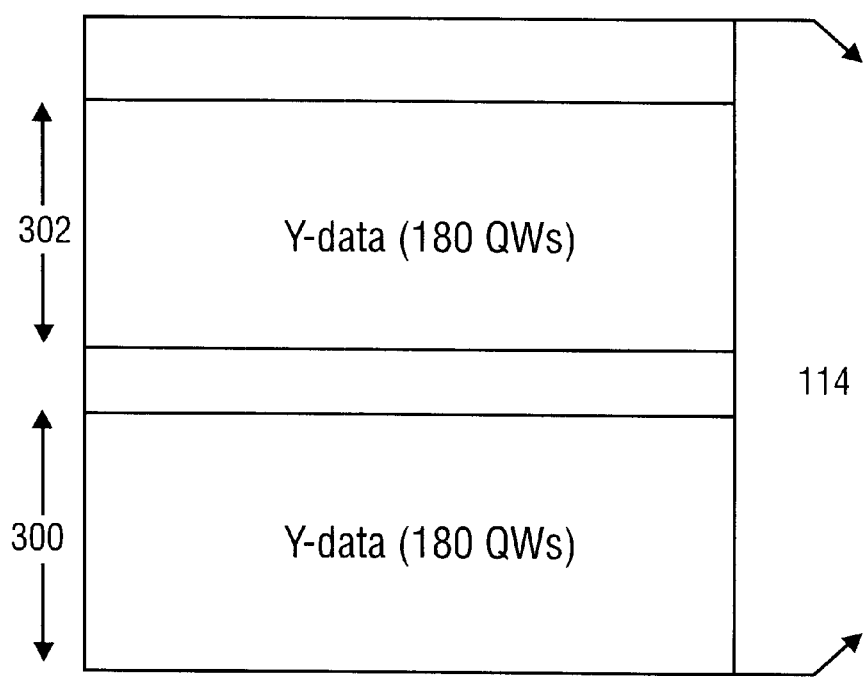
FIG. 6 illustrates an example memory layout of either a one line buffer configuration or a two line buffer configuration for data in packed video data format.

For yet another type of video data format, packed format, such as YUV422, RGB555, RGB565, YUV411, FIG. 6 illustrates the memory layout for the two types of line buffer configurations. For a packed video data, Y, U and V data (or R, G and B data) are mixed together in a QW. Therefore, instead of organizing various YUV or RGB data into distinct groups as in planar video data format, packed video format only has one group. Therefore, the one line buffer configuration and the two line buffer configuration have the same memory layout as illustrated in FIG. 6.

FIGS. 4(a), 4(b), 5(a), 5(b) and 6 are some of the line buffer configurations LBC 100 is capable of establishing. Although particular video data formats are used to illustrate the various line buffer configurations in memory 114, one ordinarily skilled in the art can design and implement LBC 100 to operate on other types of data with a different memory layout without exceeding the scope of the disclosed LBC 100.

In one embodiment of LBC 100, boundary generator 104 follows a set of equations to establish boundary addresses, or boundary information 106, for various types of video data. One such set of equations is shown below:

| | |
|---|---|
| $Y\text{min}=0$ | Equation 1 |
| $Y\text{max}=Yqw-1$ | Equation 2 |
| $Y\text{mid}=\text{ShiftRight}(Y\text{max})$ | Equation 3 |
| $U\text{min}=Yqw$ | Equation 4 |
| $U\text{max}=V\text{min}-1$ | Equation 5 |
| $V\text{min}=Yqw+UVqw$ | Equation 6 |
| $V\text{max}=U\text{max}+UVqw$ | Equation 7 |

1. The equations above cover both planar video data formats, such as YUV420 and YUV410, and packed video data formats, such as YUV422, YUV411, RGB555 and RGB565. Ymin represents the lowest address of either a Y-data buffer for YUV planar video data formats or the lowest address of a line buffer containing packed video data formats. Ymin is also equal to address 304 as shown in FIG. 3. In one embodiment, Ymin and address 304 start at 0 as indicated by equation 1.

2. Ymax represents the highest address of either a Y-data buffer for YUV planar video data formats or the highest address of a line buffer containing packed video data formats. Yqw, on the other hand, represents the number of QW either in one video line of Y-data for YUV planar video data formats or in one video line of packed video data formats.

3. Ymid represents the mid-point address of either a Y-data buffer for YUV planar video data formats or the mid-point address of a line buffer containing packed video data formats.

4. Umin represents the lowest address of a U-data buffer for YUV planar video data formats. It has no meaning for packed video data formats.

5. Umax represents the highest address of a U-data buffer for YUV planar video data formats. It has no meaning for packed video data formats.

6. Vmin represents the lowest address of a V-data buffer for YUV planar video data formats. It has no meaning for packed video data formats. UVqw, on the other hand, represents the number of QW in one video line of either U-data or V-data for YUV planar video data formats. It has no meaning for packed video data formats.

7. Vmax represents the highest address of a V-data buffer for YUV planar video data formats. It has no meaning for packed video data formats.

These mentioned equations apply to both one line buffer and two line buffer configurations. Data size information such as, Yqw and UVqw, can be part of input data information 102 and tends to vary based on video source data, which may change from one frame to the next. Thus, boundary information 106 changes according to input data information 102. Unlike predefining a number and configurations of line buffers in the Background section, LBC 100 is capable of using the varying boundary information 106 to efficiently and dynamically establishing different line buffer configurations in memory 114 to support various video data formats and video frame sizes.

Although one set of equations has been described, it should have been apparent to one ordinarily skilled in the art to formulate a different set of equations without exceeding the scope of the disclosed LBC 100. For instance, Umin in equation 4 or Vmin in equation 6 may add an offset to Yqw or (Yqw+UVqw) respectively. Additionally, Ymin may begin with a non-zero value initially. As long as LBC 100 has data size or data format information, LBC 100 can establish appropriate equations to dynamically configure line buffers within a same physical memory.

Figure 7:
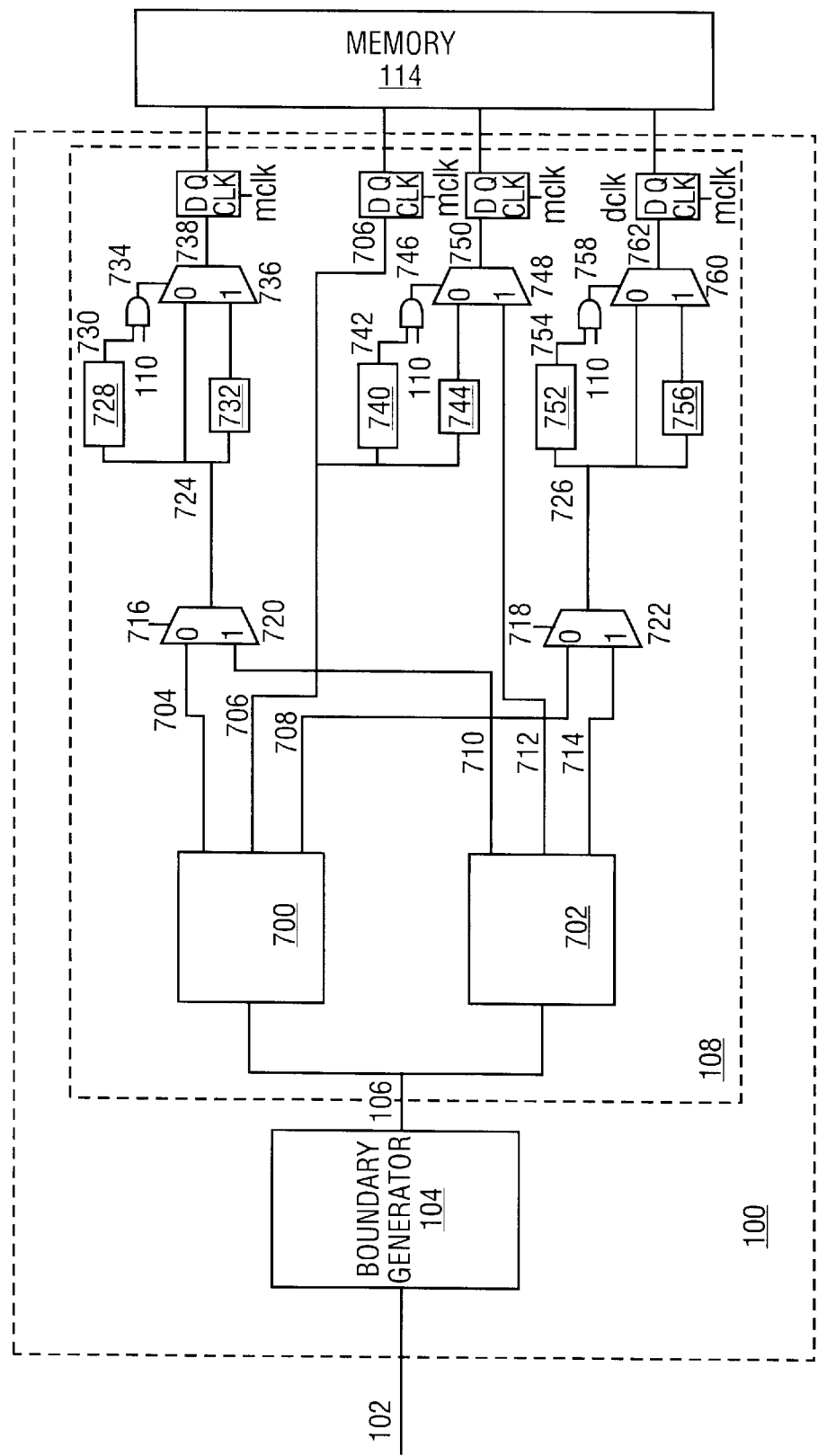
FIG. 7 illustrates a logic diagram for one embodiment of a line buffer configurator.

FIG. 7 illustrates one implementation of line buffer address generator 108. In this implementation, LBC 100 is capable of dynamically configuring memory 114 for either one line buffer or two line buffers depending on input data information 102 and mode information 110. More specifically, after boundary generator 104 produces boundary information 106, 106 goes to block 700 and block 702 of line buffer address generator 108.

As has been discussed previously, the one line buffer configuration may utilize either address ranges of lower half 300 only or address ranges of both lower half 300 and higher half 302 shown in FIG. 3. The following discussions use line buffer 0 to refer to these two scenarios. On the other hand, in the two line buffer configuration, line buffer 0 corresponds to lower half 300, and line buffer 1 corresponds to higher half 302. Block 700 is responsible for generating read and write addresses for line buffer 0. Block 702 is responsible for line buffer 1. These read and write addresses are further divided into: address 704 for the write addresses of line buffer 0, address 706 for the feedback read addresses of line buffer 0, address 708 for the display read addresses of line buffer 0, address 710 for the write addresses of line buffer 1, address 712 for the feedback read addresses of line buffer 1 and address 714 for the display read addresses of line buffer 1.

Address 704 and address 710 are inputs to multiplexer 720. Select signal 716 selects either address 704 or address 710 according to mode information 110. In other words, when mode information 110 indicates one line buffer configuration, select signal 716 chooses write address of line buffer 0, or address 704. In a two line buffer situation, select signal 716 may alternate between address 704 and 710. In an analogous manner, select signal 718 and multiplexer 722 manages address 708 and 714, or the display read addresses of both line buffer 0 and line buffer 1, respectively.

After multiplexer 720 and multiplexer 722 selects appropriate read and write addresses, outputs of the multiplexers are generated and are labeled as output 724 and output 726, respectively. In this embodiment, comparator 728 checks whether output 724 exceeds the boundary established by highest available address 306 as has been shown in FIG. 3. The outcome of such comparison, or output 730, is then logically ANDed with mode information 110 to generator select signal 734 for multiplexer 736.

More particularly, in the implementation at hand, when one line buffer configuration using both lower half 300 and higher half 302 is desired, mode information 110 is asserted high to indicates this configuration. In other words, select signal 734 is asserted high when the selected write address, output 724, exceeds highest available address 306, and when line buffer address generator 108 is instructed to generate addresses for one line buffer configuration. Under this condition, the final write address for memory 114, or output 738, is the resulting address from adder 732's incrementing output 724 by offset 312 as been illustrated in FIG. 3. On the other hand, when either two line buffer configuration is desired or output 723 does not exceed highest available address 306, output 738 is output 724 without modifications.

Analogous to the described process for generating output 738, final feedback read address, or output 750, and final display read address, or output 762 are also generated for memory 114. These outputs, 738, 706, 750 and 762 are inputs into a bank of flip flops, and the outputs of these flip flops eventually reach memory 114 on MCLK or DCLK clock edges.

Thus, a method and apparatus for defining a line buffer configuration in a memory have been disclosed. Although the method and apparatus have been described particularly with reference to the figures, the method and apparatus may appear in any number of systems and still perform all the discussed functionality. It is further contemplated that many changes and modifications may be made by one of ordinary skill in the art without departing from the spirit and scope of the disclosure.

What is claimed is:

1. A method of defining a line buffer configuration in a memory, comprising:

receiving input data information and mode information;

selecting the type of the line buffer configuration according to the mode information; and dynamically generating addresses for the selected type of line buffer configuration in the memory according to the input data information, wherein the dynamically generating further comprises incrementing the generated addresses by a pre-determined offset when:
 the mode information indicates the type of line buffer configuration, which uses a higher half and a lower half of the memory; and
 the generated addresses exceed address ranges of the lower half.

2. The method according to claim 1, wherein the input data information further comprises data format information and data size information, and the mode information indicates a type of line buffer configuration.

3. The method according claim 2, wherein the dynamically generating further comprises:
 generating a lowest available address for the line buffer configuration; and
 generating a highest available address for the line buffer configuration according to the data size information and the lowest available address.

4. The method according to claim 3, wherein the dynamically generating further comprises generating a mid-point address for the line buffer configuration according to the highest available address.

5. The method according to claim 1, wherein the memory is a Static Random Access Memory (SRAM) and is segmented into a higher half and a lower half.

6. The method according to claim 5, wherein addresses of the higher half have ones as their most significant bits (MSBs), and addresses of the lower half have zeroes as their MSBs.

7. The method according to claim 1, wherein the input data information comprises planar and packed video data.

8. The method according to claim 1, wherein the addresses generated further comprise write addresses and read addresses.

9. An apparatus for defining a line buffer configuration in a memory, comprising:
 a boundary generator to receive input data information and to generate a lowest available and a highest available addresses for the line buffer configuration according to the input data information; and
 a line buffer address generator, coupled to the boundary generator, to receive mode information and to dynamically generate read and write addresses to the memory according to the mode information and output from the boundary generator,
 wherein the line buffer address generator further comprises incrementing the read and write addresses by a pre-determined offset when:
  the mode information indicates the type of line buffer configuration, which uses a higher half and a lower half of the memory; and
  either the read or the write addresses exceed address ranges of the lower half.

10. The apparatus according to claim 9, wherein the input data information further comprises data format information and data size information, and the mode information indicates a type of line buffer configuration.

11. The apparatus according claim 10, wherein the boundary generator generates the highest available address according to the data size information and the lowest available address.

12. The apparatus according to claim 10, wherein the boundary generator further generates a mid-point address for the line buffer configuration according to the highest available address.

13. The apparatus according to claim 9, wherein the memory is a Static Random Access Memory (SRAM) and is segmented into a higher half and a lower half.

14. The apparatus according to claim 13, wherein addresses of the higher half have ones as their most significant bits (MSBs), and addresses of the lower half have zeroes as their MSBs.

15. The apparatus according to claim 9, wherein the input data information comprises planar and packed video data.

16. An electronic system for defining a line buffer configuration in a memory, comprising:
 a processor bus coupled to the memory; and
 a plurality of microprocessors, coupled to the processor bus wherein the plurality of microprocessors further comprises:
  a boundary generator to receive input data information and to generate a lowest available and a highest available addresses for the line buffer configuration according to the input data information; and
  a line buffer address generator, coupled to the boundary generator, to receive mode information and to generate read and write addresses to the memory according to the mode information and output from the boundary generator,
 wherein the line buffer address generator further comprises incrementing the read and write addresses by a pre-determined offset when:
  the mode information indicates the type of line buffer configuration, which uses a higher half and a lower half of the memory; and
  either the read or the write addresses exceed address ranges of the lower half.

17. The electronic system according to claim 16, wherein the input data information further comprises data format information and data size information, and the mode information indicates a type of line buffer configuration.

18. The electronic system according claim 17, wherein the boundary generator generates the highest available address according to the data size information and the lowest available address.

19. The electronic system according to claim 17, wherein the boundary generator further generates a mid-point address for the line buffer configuration according to the highest available address.

20. The electronic system according to claim 16, wherein the memory is a Static Random Access Memory (SRAM) and is segmented into a higher half and a lower half.

21. The electronic system according to claim 20, wherein addresses of the higher half have ones as their most significant bits (MSBs), and addresses of the lower half have zeroes as their MSBs.

22. The electronic system according to claim 16, wherein the input data information comprises planar and packed video data.

* * * * *